United States Patent
Shimoda (10) Patent No.: US 8,979,949 B2
(45) Date of Patent: Mar. 17, 2015

(54) FINE CRYSTAL PARTICLE PRODUCTION METHOD

(75) Inventor: Mitsuya Shimoda, Fukuoka (JP)

(73) Assignee: Kyushu University, National University Corporation, Fukuoka-Shi (JP)

( * ) Notice: Subject to any disclaimer, the term of this patent is extended or adjusted under 35 U.S.C. 154(b) by 19 days.

(21) Appl. No.: 14/005,432

(22) PCT Filed: Mar. 19, 2012

(86) PCT No.: PCT/JP2012/056997
§ 371 (c)(1),
(2), (4) Date: Nov. 13, 2013

(87) PCT Pub. No.: WO2012/132990
PCT Pub. Date: Oct. 4, 2012

(65) Prior Publication Data
US 2014/0072503 A1    Mar. 13, 2014

(30) Foreign Application Priority Data
Mar. 31, 2011  (JP) ................................. 2011-077036

(51) Int. Cl.
| | | |
|---|---|---|
| C01F 5/34 | (2006.01) | |
| C01F 11/18 | (2006.01) | |
| B01F 3/08 | (2006.01) | |
| B01F 5/00 | (2006.01) | |
| B01F 5/04 | (2006.01) | |
| B01J 19/24 | (2006.01) | |
| B01D 9/00 | (2006.01) | |

(52) U.S. Cl.
CPC ............. *C01F 11/181* (2013.01); *B01F 3/0865* (2013.01); *B01F 5/0065* (2013.01); *B01F 5/0473* (2013.01); *B01F 5/0476* (2013.01); *B01J 19/2405* (2013.01); *B01J 19/2475* (2013.01); *B01D 9/0054* (2013.01); *C01F 11/18* (2013.01); *C01P 2004/03* (2013.01); *C01P 2004/61* (2013.01); *C01P 2004/62* (2013.01)
USPC .......................................... 23/304; 23/295 R (58) Field of Classification Search
USPC ................... 23/304, 295 R, 299, 300
See application file for complete search history.

(56) References Cited

U.S. PATENT DOCUMENTS
2011/0038901 A1   2/2011   Windhab et al.

FOREIGN PATENT DOCUMENTS
| | | |
|---|---|---|
| EP | 0475930 A1 | 3/1992 |
| GB | 2419100 A | 4/2006 |
| JP | 2007-268350 A | 10/2007 |
| JP | 2008-510607 A | 4/2008 |
| WO | 2008/038763 A1 | 4/2008 |

OTHER PUBLICATIONS

Extended European Search Report dated Aug. 1, 2014, issued in European Patent Application No. 12764796.4.

*Primary Examiner* — Edward Johnson
(74) *Attorney, Agent, or Firm* — Birch, Stewart, Kolasch & Birch, LLP (57) ABSTRACT

An object of the present invention is to provide a fine crystal particle production method and device that are excellent in mixing efficiency.
This object is achieved by a method for producing fine crystal particles, comprising: a swirl flow producing step at which a swirl flow of liquid a comprising reactant A is supplied into a cylinder having a circumferential surface partially or wholly composed of a porous membrane; and a reaction step at which liquid b comprising reactant B which is reactive with the reactant A is supplied through the porous membrane to the swirl flow to effect mixing, whereby the reactants A and B are reacted to precipitate fine crystal particles.

11 Claims, 3 Drawing Sheets

FINE CRYSTAL PARTICLE PRODUCTION METHOD

TECHNICAL FIELD

The present invention relates to a fine crystal particle production method and device that are excellent in mixing efficiency.

BACKGROUND ART

When two or more reactants are reacted, any local heterogeneity in reactant concentration is likely to cause formation of by-products. A heterogeneous concentration can cause non-uniformity in the particle size and crystal form of the product precipitated in a reaction system in the form of fine crystal particles. Thus, it is necessary to produce a compound at a high yield using a simple process. Also, in order to produce a crystalline compound with a non-uniform particle size using a simple process, efficient mixing of reactants is needed.

In a mixing process, reactant fluids are forcedly stirred by laminar or turbulent flow, further diffusing reactant molecules mutually. According to the Fick's law of diffusion, the diffusion time is proportional to the square of diffusion distance, so the diffusion time can be reduced by decreasing the diffusion distance. More specifically, in a mixing process, the mixing rate at a molecular level can be increased considerably by forcibly stirring two or more reactant fluids to thereby divide them into fine segments and bring the segments into contact with each other.

In recent years, microreactors have attracted attention as a means for increasing the mixing rate. The microreactor means a chemical reaction device utilizing the interior of a microspace of several to several hundred micrometers. With the use of the microspace, the surface area of reactants per unit volume of a reaction system as well as the area of contact between the reactants become greater, so that effective mixing and interface reaction can be effected. Further, in standard, non-microreactor plants, stirring efficiency varies greatly with the increase in scale, so the reaction conditions need to be reconsidered when those plants are scaled up. On the other hand, the production scale of microreactors can be expanded not by "scaling up" (increasing the size) but by "numbering up" (increasing the number of reactive sites); thus, a rapid shift from research and development to industrial production can be achieved. In reality, however, there is a limit on the expansion of the production scale of microreactors by the numbering up approach; accordingly, there has been a need for a new device and method.

The membrane reactor which supplies liquid b to liquid a through a porous membrane to react them is expected to be a device that is effective for expanding production scale while maintaining excellent mixing performance. A known membrane reactor is exemplified by a reactor that uses a cylindrical porous membrane made of Shiras porous glass (hereinafter also referred to as "SPG membrane") (Non-patent Document 1). In this type of membrane reactor, liquid a is supplied into a cylindrical porous membrane such that the streamline forms a straight line parallel to the longitudinal direction of the cylinder, and liquid b is supplied to liquid a through the porous membrane. In other words, liquid a is caused to flow orthogonally to the flow of liquid b and is thus also referred to as a "cross-flow liquid." The cross-flow liquid is susceptible to being eliminated from the surface of the membrane by the flow of liquid b. This results in retention of liquid b in the vicinity of the membrane surface, leading to a decrease in the efficiency of its mixing with the cross-flow liquid.

Thus, Yong Wu, et al., proposed that, in order to increase the mixing efficiency, static stirrers of different shapes should be placed in the cylinder made of a cylindrical porous membrane to effectively stir a cross-flow liquid (Non-patent Document 2). However, this method involves difficulty in precisely controlling the flow of the cross-flow liquid in the boundary layer on the membrane surface and does not show an adequate mixing effect.

CITATION LIST

Non-Patent Documents

Non-patent Document 1: Journal of Membrane Science, Vol. 299 (2007), 190-199

Non-patent Document 2: Journal of Membrane Science, Vol. 328 (2009), 219-227

SUMMARY OF INVENTION

Technical Problem

In light of these circumstances, an object of the present invention is to provide a fine crystal particle production method and device that are excellent in mixing efficiency.

Solution to Problem

As a result of intensive studies, the present inventors have found that the above-mentioned object can be achieved by supplying liquid b comprising reactant B to the swirl flow of liquid a comprising reactant A through a porous membrane to react reactants A and B. More specifically, the present invention achieves said object by providing:

(1) a method for producing fine crystal particles, comprising: a swirl flow producing step at which a swirl flow of liquid a comprising reactant A is supplied into a cylinder having a circumferential surface partially or wholly composed of a porous membrane; and a reaction step at which liquid b comprising reactant B which is reactive with the reactant A is supplied through the porous membrane to the swirl flow to effect mixing, whereby the reactants A and B are reacted to precipitate fine crystal particles; or (2) the method as set forth in (1), which uses a device comprising: a cylinder having a circumferential surface partially or wholly composed of a porous membrane, the cylinder being provided on the circumferential surface in the vicinity of one end thereof with an inlet for the liquid a comprising the reactant A and also provided in a cross section of the other end thereof with an outlet for a product; an introducing pipe that is connected to the inlet such that the liquid a can flow approximately vertically to an axis of the cylinder and from a tangential direction to an inner wall of the cylinder, the introducing pipe which extends approximately vertically to the axis of the cylinder and in the tangential direction to the inner wall of the cylinder; a storage portion for storing the liquid b comprising the reactant B, the storage portion being provided on an outside of the circumferential surface of the cylinder; and a supply means for supplying the liquid b from the storage portion into the cylinder.

Advantageous Effects of Invention

The present invention can provide a fine crystal particle production method and device that are excellent in mixing efficiency. In particular, the present invention makes it possible to produce fine crystal particles with low polydispersity.

DESCRIPTION OF EMBODIMENTS

1. Production Method

The production method of the present invention comprises a swirl flow producing step at which a swirl flow of liquid a comprising reactant A is supplied into a cylinder having a circumferential surface partially or wholly composed of a porous membrane; and a reaction step at which liquid b comprising reactant B which is reactive with the reactant A is supplied through the porous membrane to the swirl flow to effect mixing, whereby the reactants A and B are reacted to precipitate fine crystal particles.

(1) Swirl Flow Producing Step

1) Liquid a Comprising Reactant A

At this step, liquid a comprising reactant A is caused to flow into a cylinder having a circumferential surface partially or wholly composed of a porous membrane. The reactant A means a substance to be reacted with reactant B which is to be supplied at the next step. The reactant A may be an inorganic or organic substance. The inorganic substance is not limited, and examples include inorganic acids such as hydrochloric acids, inorganic bases such as sodium hydroxides, carbonates such as sodium carbonates, inorganic acids, inorganic bases, inorganic reducing agents, inorganic oxidizing agents, hydrochlorides, carbonates, nitrates, sulfates, and carbonates. The organic substance is also not limited, and examples include organic acids such as acetic acids, organic bases such as amines, organic salts of such acids or bases, esters such as ethyl acetates, alcohols such as ethyl alcohols, various coupling reagents, and various complex compounds such as platinum (II) acetylacetonate. One type of reactant A may be used alone, or two or more types may be used in combination.

The liquid a can be prepared by dissolving or dispersing the reactant A in a known solvent. The solvent may be aqueous or oily. If the reactant A is liquid, it may directly be used as the liquid a. It is sufficient that the liquid a be liquid when it is supplied to a cylinder. Thus, for example, a substance that is solid at room temperature but becomes liquid by being heated can also be used as the liquid a. Alternatively, a supercooled liquid that is liquid at room temperature but solidifies with time can also be used. In consideration of workability, this step is preferably taken at room temperature (20-30° C.), so the liquid a is preferably liquid at room temperature.

2) Cylinder

The cylinder means a cylindrical hollow member. The cylinder of the present invention has a circumferential surface partially or wholly composed of a porous membrane. The porous membrane means a membrane having many fine through-holes. As such a membrane, a known porous membrane made of glass, ceramic, nickel, or the like can be used. In the present invention, a porous membrane made of glass is preferred, and a porous membrane made of Shirasu porous glass (SPG membrane) as disclosed in Non-patent Document 1 is more preferred. The average pore size of the porous membrane is not limited as long as it is within the range of what is generally considered to be a pore size of a porous membrane, but in order that when a compound is obtained in the form of fine crystal particles, the particles have an industrially preferred particle size, the average pore size is preferably in the range of 0.5 to 10 μm and more preferably in the range of 1 to 5 μm. The porosity and average pore size of the porous membrane can be measured by mercury intrusion porosimetry (using an automated porosimeter).

The phrase "having a circumferential surface partially or wholly composed of a porous membrane" means that that part of the circumferential surface which is used to supply liquid b is composed of a porous membrane, whereas the other part may be composed of some other material. In the present invention, however, for the purpose of increasing the membrane area that can be effectively used to produce a compound (hereinafter also referred to as "effective membrane area"), it is preferred that the circumferential surface should be wholly composed of a porous membrane.

As will be mentioned later, in the present invention, the liquid a is preferably introduced from the circumferential surface of the cylinder and approximately vertically to the axis of the cylinder. In such a case, it is preferred that the circumferential surface of the cylinder should be wholly composed of a porous membrane and that part of the porous membrane which is in the vicinity of the place where the liquid a is to be introduced should be subjected to such a treatment that prevents the liquid a from leaking out of the cylinder. To be specific, the liquid a can be prevented from leaking out of the cylinder by applying a coating to the inner wall surface or outer wall of said part of the porous membrane. Alternatively, a cylinder having a circumferential surface composed of some other material may be connected to an end of a cylinder having a circumferential surface composed of a porous membrane to provide an integral cylinder, and the integral cylinder may be used as the cylinder of the present invention.

The shape and size of the cylinder of the present invention are not particularly limited, and it is preferred that the cross-sectional area thereof should be fixed longitudinally and that the inner diameter thereof should be in the range of 5 to 100 mm. If the inner diameter is lower than 5 mm, it may be difficult, in some cases, to generate a swirl flow in the cylinder. If the inner diameter is higher than 100 mm, an excessive supply of the liquid a may be required to generate a swirl flow. The length of the cylinder is preferably 2-50 times the inner diameter thereof. If the length is less than twice the inner diameter, the effective membrane area will be smaller so that the mixing efficiency can decrease. In contrast, if the length is more than 50 times the inner diameter, the swirling velocity in the cylinder will be non-uniform so that the mixing efficiency can decrease.

3) Swirl Flow

Figure 1:
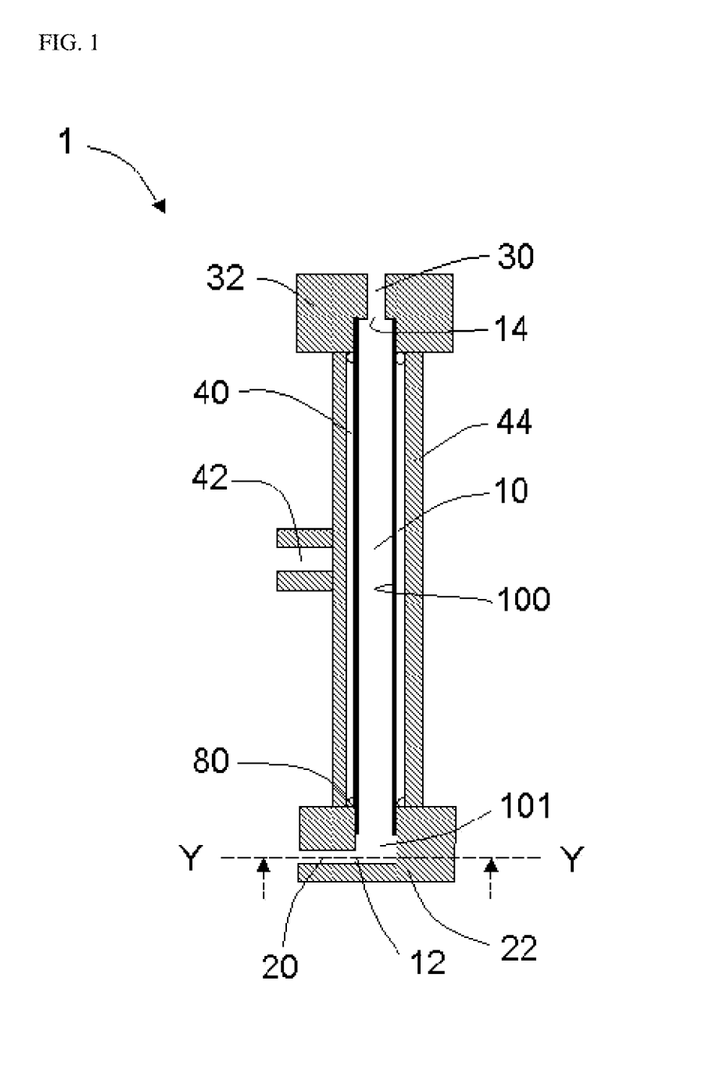
FIG. 1 is a schematic diagram of a preferred device of the present invention.

The swirl flow means a flow that combines a flow along the axis of the cylinder with a flow along the circumferential surface. The swirl flow can be generated by a known technique. For example, a screw propeller is provided on an end of the cylinder and, while the screw propeller is rotated, the liquid a is supplied to the cylinder, whereby a swirl flow of the liquid a can be fed into the cylinder. In the present invention, however, the swirl flow is preferably fed as shown in FIG. 1. Generating a swirl flow in such a manner provides advantages such as ease of controlling a swirling velocity. The following describes this mode with reference to a figure.

Figure 3:
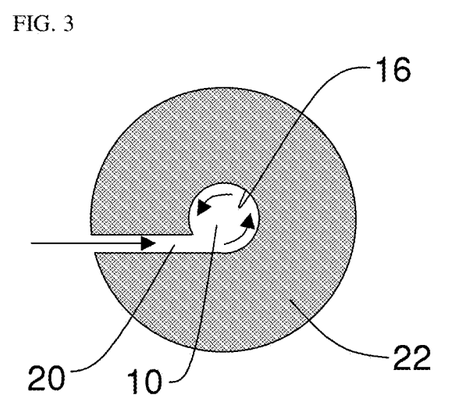
FIG. 3 is a cross-sectional view of section Y-Y in FIG. 1 as viewed from the direction of arrows.

FIG. 1 shows a schema of a preferred device of the present invention. In FIG. 1, 1 represents a production device of the present invention, and 10 represents a cylinder. In the cylinder 10, 100 represents a porous membrane portion having a circumferential surface composed of a porous membrane, and 101 represents a non-porous membrane portion having a circumferential surface composed of some other member. 12 represents an inlet for the liquid a, 14 represents an outlet, 20 represents an introducing pipe, 22 represents a member constituting the introducing pipe, 30 represents a discharge pipe, 32 represents a member constituting the discharge pipe, 40 represents a storage portion for the liquid b, 42 represents an introducing pipe for the liquid b, and 44 represents a member constituting the storage portion. In FIG. 1, 80 represents a seal ring. FIG. 3 is a cross-sectional view of section Y-Y in FIG. 1 as viewed from the direction of arrows. In FIG. 3, 16 represents an inner wall surface of the cylinder 10.

As shown in FIG. 1, the cylinder 10 has the inlet 12 being provided on a circumferential surface in the vicinity of one end thereof (i.e., a circumferential surface of the non-porous membrane portion 101), and the inlet 12 has connected thereto the introducing pipe 20 which extends approximately vertically to the axis of the cylinder. The term "vicinity" as used herein refers to the range from the origin to 0.1, with the origin being an end of the cylinder which is assumed to have a total length of 1. The term "approximately vertically" means that the angle formed by the axes of the introducing pipe 20 and the cylinder 10 is in the range of 85 to 95°, preferably in the range of 88 to 92°, and more preferably 90° (vertical). As shown in FIG. 3, the introducing pipe 20 extends in the tangential direction to the cylinder 10 so that the liquid a can be introduced from the tangential direction to the inner wall surface 16 of the cylinder 10. In other words, part of the inner wall surface of the introducing pipe 20 is located on the same plane as the tangent to the inner wall surface 16 of the cylinder 10. The flow of the liquid a runs along the inner wall surface 16 in the circumferential direction of the cylinder 10 and, at the same time, is pushed out toward the other end of the cylinder 10, so that a swirl flow is produced. In other words, this preferred mode of the present invention is significantly different from conventional cross-flow techniques in that the liquid a is caused to flow along the circumferential surface of the cylinder 10 from the vertical direction to the axis of the cylinder 10 to thereby produce a swirl flow.

In the present invention, the swirl flow velocity in the circumferential direction (hereinafter also referred to as "swirling velocity") and that in the axial direction of the cylinder (hereinafter also referred to as "axial velocity"; and the swirling and axial velocities are also collectively referred to simply as "swirl flow velocity") are preferably controlled according to the value obtained by dividing the flow rate of the liquid a running through the introducing pipe 20 by the inner-diameter cross-sectional area of the introducing pipe 20, i.e., according to the inlet linear velocity. The inlet linear velocity should be optimized in relation to the inner diameter of the cylinder, and is preferably in the range of about 1 to 40 m/s and more preferably in the range of 2 to 20 m/s. When the inlet linear velocity is within said range, mixing efficiency will be improved. And fine crystal particles with low polydispersity will be produced. The cross section of the introducing pipe 20 can be of any shape such as a rectangular shape or a circular shape, and the circular shape is preferred because this shape is easy to produce and makes it easy to obtain a uniform flow of the liquid a in the introducing pipe 20.

In the present invention, it is preferred that the thicknesses of the introducing pipe 20 and the cylinder 10 should have a specific relationship, since a swirl flow can then be effectively produced in the cylinder 10. The thicknesses of the cylinder 10 and the introducing pipe 20 preferably have such a relationship that, when the inner-diameter cross-sectional area of the cylinder 10 is denoted as S1 and that of the introducing pipe 20 is denoted as S2, the area ratio S1/S2 is in the range of 4 to 64. The innerdiameter cross-sectional area refers to, for example, in the case of the cylinder 10, the cross-sectional area of the portion through which the liquid a flows, and specifically refers to the area of a circle whose diameter is defined by the inner diameter of the cylinder 10. It is also preferred that in a particular case where the cross sections of the cylinder 10 and the introducing pipe 20 are of circular shapes having inner diameters denoted as X1 and X2, respectively, the inner diameter ratio X1/X2 should be in the range of 2 to 8.

Furthermore, the mode and axial velocity of the swirl flow in the cylinder 10 are affected by the size of the outlet 14 (Non-patent Document 3: *Transactions of the Japan Society of Mechanical Engineers*, Series B, Vol. 58, No. 550, p. 1668-1673 (1992)). If the cylinder 10 of the present invention has the outlet 14 as shown in FIG. 1, it is preferred from the viewpoint of ease of production and the like that the cross section of the outlet 14 should be of a circular shape. When the inner diameter of the outlet 14 having a circular shape is denoted as X0, the ratio of the inner diameter of the cylinder 10 (X1) to that of the outlet 14 (X0), i.e., ratio X1/X0, is preferably in the range of 1 to 5 and more preferably in the range of 1 to 3. X0 can be adjusted by varying the shape of the member 32 disposed at an end of the cylinder 10. The member 32 will be described later.

According to the present production method, the orientation for placing the device of the present invention is not limited, and the device is preferably placed such that the axis of the cylinder 10 is approximately vertical. This is because, when the swirl plane of the liquid a which swirls in the interior of the cylinder 10 is orthogonal to the direction of gravity, the swirling motion is less susceptible to acceleration of gravity. The term "approximately vertical" means that the angle formed by the horizontal line and the axis of the cylinder 10 is in the range of 85 to 95°, preferably in the range of 88 to 92°, and more preferably 90°.

By using the thus-produced swirl flow of the liquid a, high mixing efficiency can be obtained so that fine crystal particles with low polydispersity can be produced. This mechanism will be described later.

The swirl flow stirs the two liquids vigorously. Thus, the higher energy the liquid a has, the higher the stirring efficiency is. Therefore, the flow rate of the liquid a is preferably higher than that of the liquid b described later. To be specific, the ratio (of the flow rate of the liquid a to that of the liquid b) is preferably in the range from 4 to 10.

Further, the reactant B contained in the liquid b may be inferior to the reactant A contained in the liquid a in terms of mobility in a reaction system. The reason for this is that since the diameter of the liquid columns of the liquid b jetted from the porous membrane is considered to be approximately the same as the pore size of the porous membrane (generally about 2 μm), the diffusion distance for colliding with the reactant A needs only to be short. In order for the reactant A having high mobility to collide with the reactant B, the reactant A must migrate in the liquid a for a long distance. High mobility of the reactive A and vigorous stirring of the liquid a enable the reactant A to efficiently collide with the reactant B, whereupon fine crystal particles having smaller particle size can be produced.

On the other hand, if the reactant A contained in the liquid a is inferior in mobility to the reactant B, the liquid a will then hardly increase the mobility of the reactant A, so that the resulting fine crystal particles will be more prone to have a greater particle size. The mobility of a reactant in a reaction system typically depends on the bulkiness including salvation structure. For example, the mobility of carbonate ions is $7.2 \times 10^{-4}$ ($cm^2$ $s^{-1}V^{-1}$), and that of calcium ions is $6.2 \times 10^{-4}$ ($cm^2$ $s^{-1}V^{-1}$).

The ionic mobility can be determined by the following equation:

$$u_i = \lambda_i / F$$

where $u_i$ is the ionic mobility of ion i ($cm^2$ $s^{-1}V^{-1}$), $\lambda_i$ is the equivalent ionic conductivity ($\Omega^{-1}$ $cm^2$ $mol^{-1}$), and F is the Faraday constant.

(2) Reaction Step

1) Liquid b Comprising Reactant B

At this step, liquid b is supplied to the swirl flow through the porous membrane. The liquid b comprises reactant B. The reactant B is sufficient if it reacts with the reactant A to produce crystals in a reaction system through precipitation, and specific examples thereof include those exemplified for the reactant A. Like the reactant A, the reactant B can also be one or more substances. The liquid b can be provided by the same procedure as the liquid a, and it is preferred that the liquids a and b should be compatible with each other, since this allows more rapid dispersion of the reactant B, thereby further increasing the mixing efficiency.

A preferred combination of the liquids a and b can be exemplified by a combination of an aqueous sodium carbonate solution as the liquid a and an aqueous calcium chloride solution as the liquid b. In such a case, calcium carbonate can be produced as fine crystal particles.

2) Supplying Method

The liquid b is supplied into the swirl flow of the liquid a through the porous membrane. This supply can be achieved by any method without particular limitation. However, this supply is preferably achieved by the following method as shown in FIG. 1: the member 44 is disposed around the outer periphery of the cylinder 10 to provide the storage portion 40, the storage portion 40 is charged with the liquid b, and a pressure controller (not shown) for appropriately adjusting the pressure in this portion is used to supply the liquid b. Since the swirl flow of the liquid a has been produced in the interior of the cylinder 10, the liquid b is mixed with the liquid a immediately after being supplied into the cylinder 10. In the present invention, the liquid b is preferably supplied at a rate of about 50 to 250 mL/min. According to the method disclosed in Non-patent Document 1, the supply rate is much lower than 50-250 mL/min., and increasing the supply rate results in a decrease in mixing efficiency. According to the present invention, however, high mixing efficiency can be achieved even when the supply rate is increased. It is considered that the liquid b supplied at such a rate is supplied as a jet flow through the porous membrane into the swirl flow of the liquid a. The temperature at which to supply the liquid b is not particularly limited, and a room temperature (20-30° C.) is preferred as described above.

(3) Removal Step

The produced compound is removed from the outlet 14 provided at an end of the cylinder 10. As described above, the outlet is preferably provided in a cross section at an end of the cylinder 10 to have a circular shape with a specific inner diameter. The compound may also be removed through the discharge pipe 30 connected to the outlet 14.

(4) Mechanism of Action

The mechanism by which the present invention makes it possible to achieve high mixing efficiency and also to produce fine crystal particles with low polydispersity is not limited but is considered to be as follows. First, the liquid b supplied through the porous membrane forms minute segments in the swirl flow of the liquid a. These segments take the form of liquid droplets or liquid columns. The liquid column means a columnar flow composed of the liquid b and having a cross section generally circular in shape. For the purpose of the present invention, the liquid columns include those deformed into a distorted shape (e.g., wavy shape) by the swirl flow.

When the liquid a is supplied as a cross-flow stream like in conventional methods, said cross flow is pushed away from the surface of the porous membrane by the flow of the segments of the liquid b. Thus, the liquid b is prone to be retained in the vicinity of the porous membrane surface. When the liquid b is supplied as a jet flow, this phenomenon will be more prominent since the jet flow pushes the liquid a away from the membrane surface more easily. Such a retention of the liquid b results in a decrease in mixing efficiency, causing variations in the particle size of the resulting fine crystal particles.

On the other hand, in the present invention, the liquid a is supplied as a swirl flow. A swirl flow has a centrifugal acceleration that depends on its swirling velocity, and thus is not pushed away from the porous membrane surface by the flow of the segments of the liquid b. Therefore, the liquid b is not retained but is rapidly dispersed in the swirl flow in the form of minute segments. The porous membrane has an infinite number of pores that are uniform in pore size to some degree, so that a large number of minute segments of the liquid b which are uniform in size are formed. The reactant B is dispersed from the minute segments to react with the reactant A, whereupon a large number of reactive sites are formed. Accordingly, in this invention, high mixing efficiency can be achieved so that the reactants A and B quickly react with each other to produce fine crystal particles with low polydispersity. Furthermore, since the method of this invention enables formation of a large number of reactive sites, the scale of production can be increased without increasing the device size. In the process, when the solvents of the liquids a and b are highly compatible with each other, the dispersibility of the minute segments of the liquid b and the diffusibility of the reactant B in the liquid b become higher, so that the reaction proceeds more quickly.

Thus, the present invention makes it possible to mix the liquids a and b with extremely high efficiency. Therefore, this invention is particularly effective in diffusion controlled reactions or, in other words, reactions in which increased mixing efficiency plays a key role.

(5) Other Modes

The preceding pages have described the case where the liquids a and b comprise the mutually reactive reactants A and B, respectively. However, the present invention can also use liquid b having substance B dissolved in solvent b', and liquid a which dissolves not the substance B but the solvent b', whereby the substance B can be precipitated in the resulting mixture to produce fine particles of the substance B. For example, when the liquid b is a polymer solution comprising a polymer and its good solvent (e.g., THF) and the liquid a is a poor solvent of the polymer (e.g., methanol), fine polymer particles with low polydispersity can be produced.

2. Fine Crystal Particles

The fine crystal particles produced by the production method of the present invention can be isolated from the resulting mixture by a known method to give the final product. Exemplary isolation methods include filtration. The average particle size of the fine crystal particles produced in the present invention, which is defined as the median particle size ($d_{50}$) corresponding to the value at which the cumulative volume percentage of particles as determined by the laser diffraction/scattering method is 50%, is preferably not greater than 100 μm, more preferably not greater than 50 μm, much more preferably not greater than 30 μm, and particularly preferably not greater than 5 μm. The lower limit of $d_{50}$ is preferably not smaller than 0.01 μm, more preferably not smaller than 0.1 μm, and much more preferably not smaller than 0.5 μm. The polydispersity defined by the following equation (1) (hereinafter also referred to as "span") is preferably not greater than 1.5, and more preferably not greater than 1.0. The lower limit of the span is not limited but is preferably not smaller than 0.5:

$$\text{Span}=(d_{90}-d_{10})/d_{50} \quad (1)$$

where:
$d_{10}$: the particle size at 10% in the cumulative distribution of particles,
$d_{90}$: the particle size at 90% in the cumulative distribution of particles,
$d_{50}$: the particle size at 50% in the cumulative distribution of particles.

In the present invention, fine calcium carbonate particles, for example, can be produced. Calcium carbonate is a white, inexpensive, non-poisonous, opaque fine powder which is typically used as a filler or an opacifying agent in papers, plastics, etc. The addition effect varies with the particle size and form of the calcium carbonate crystal, so fine particles with low polydispersity are needed. According to this invention, such fine calcium carbonate particles can be produced effectively.

According to the present invention, nano-sized fine polymer particles having an average particle size of about 50-100 nm (e.g., nano-sized pigments) can also be produced. The particle size can be controlled mainly by the velocity of a swirl flow—the higher the swirl flow velocity is, the smaller particle size the resulting fine particles have. In particular, in order to produce nano-level fine crystal particles, it is preferred that the flow rate of the liquid a should be at least 2000 mL/min, or in other words, the swirling velocity should be at least 15000 rpm.

3. Device

The production method of the present invention is preferably performed using a device comprising: (1) a cylinder having a circumferential surface partially or wholly composed of a porous membrane, the cylinder being provided on the circumferential surface in the vicinity of one end thereof with an inlet for liquid a and also provided in a cross section of the other end thereof with an outlet for the product; (2) an introducing pipe that is connected to the inlet such that the liquid a can flow approximately vertically to an axis of the cylinder and from a tangential direction to an inner wall of the cylinder, the introducing pipe which extends approximately vertically to the axis of the cylinder and in the tangential direction to the inner wall of the cylinder; (3) a liquid b storage portion for storing the liquid b, the storage portion being provided on an outside of the circumferential surface of the cylinder; and (4) a supply means for supplying the liquid b from the liquid b storage portion into the cylinder. The following pages describe the device with reference to FIG. 1 which shows a preferred embodiment of the device.

(1) Cylinder

The cylinder 10 functions as a reactor. The constitutional materials, shape, size and other features of the cylinder are as described above.

(2) Introducing Pipe

Figure 2:
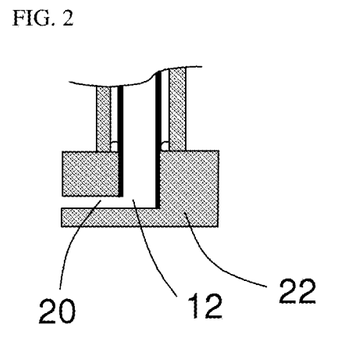
FIG. 2 is a schematic diagram of another preferred device of the present invention.

The introducing pipe 20 has a function of producing a swirl flow. As described above, the introducing pipe 20 is connected to the inlet 12 provided on the circumferential surface of the cylinder 10 and extends approximately vertically to the axis of the cylinder and in the tangential direction to the cylinder. By adjusting the thickness of the introducing pipe 20, the swirl flow velocity can be adjusted. The introducing pipe 20 is preferably formed as shown in FIGS. 1 and 2. More specifically, a thick, cylindrical member 22 having almost the same inner diameter as the cylinder 10 and having one end thereof closed is provided and is so disposed as to close an end of the cylinder 10. Then, in the member 22, a through hole is formed which extends vertically to the axis of the cylinder 10 and in a tangential direction to the cylinder 10, and this through hole serves as the introducing pipe 20. The liquid a passes through the introducing pipe 20 and flows in along an inner wall of the non-porous membrane portion 101 formed by the member 22 and having a circumferential surface composed of some other material than a porous membrane, so that it can produce a swirl flow effectively. The swirling velocity can be easily adjusted by varying the size of the through hole. The material of the member 22 is not particularly limited, and stainless steel is preferred from the viewpoint of the resistance to acids, alkalis, and organic solvents.

As shown in FIG. 2, the introducing pipe 20 may also be provided in the porous portion 100 of the cylinder 10. In such a case, however, that area of the porous portion 100 which is in the vicinity of the introducing pipe 20 is preferably subjected to coating treatment to prevent any leakage of the liquid a.

(3) Liquid b Storage Portion

It is preferred that the member 44 should be disposed to cover the outer periphery of the cylinder 10 so that a space formed between an inner wall of the member 44 and an outer wall of the cylinder 10 serves as the storage portion 40. The presence of the storage portion 40 enables supply of the liquid b from the entire porous membrane portion 100 of the cylinder 10, thereby improving production efficiency. In this mode, the distance of clearance, more specifically the difference between the inner radius of the member 44 and the outer radius of the cylinder 10, is preferably in the range of 1.0 to 10 mm, and more preferably in the range of 1.5 to 4.0 mm. If this distance of clearance is smaller than 1.0 mm, increased supply rate of the liquid b may cause a pressure distribution in the storage portion 40, thereby deteriorating the uniformity in the rate of the liquid b passing through the pores of the porous membrane. On the other hand, if this clearance is larger than necessary, the amount of the liquid b stored will increase so that the amount of the liquid b to be discarded upon disassembly or cleaning of the device will be larger, leading to waste of resource.

The material of the member 44 is not particularly limited, and stainless steel is preferred from the viewpoint of the resistance to acids, alkalis, and organic solvents. The area where the cylinder 10, the member 44, and the member 22 are connected may also have disposed therein a seal ring for preventing liquid from leaking out of the device. Exemplary seal rings include known O-rings.

(4) Supply Means

The supply means is not particularly limited, and a pump that generates only a few pulsating flows is preferred. The supply means is connected to the liquid b introducing pipe 42 provided on the member 44.

(5) Outlet and Discharge Pipe

The device of the present invention preferably has the outlet 14 and the discharge pipe 30 provided on the other end of the cylinder 10. The shape and size of the outlet 14 are as described above. The discharge pipe 30 connected to the outlet 14 is preferably formed by providing the cylindrical member 32 which has a desired inner diameter and includes a through hole for discharge, and by disposing said member so as to close an end of the cylinder 10. The material of the member 32 is not particularly limited, and stainless steel is preferred from the viewpoint of the resistance to acids, alkalis, and organic solvents.

EXAMPLES

Production Example 1

Provision of a Device

There was provided a cylinder (SPG Technology Co., Ltd.; SPG membrane; Lot No. PJN08J14) which measures 10 mm in outer diameter, 9 mm in inner diameter, and 150 mm in length and has a circumferential surface wholly composed of a Shirasu porous glass membrane (SPG membrane) with an average pore size of 2.1 μm. Also provided was a stainless steel cylindrical member 22 which is thicker than said SPG membrane cylinder, which has the same inner diameter as said cylinder, and which has one end thereof closed. As shown in FIG. 1, the member 22 was so disposed as to close an end of the SPG membrane cylinder, so that a cylindrical space measuring 5 mm in length and having a circumferential surface composed of stainless steel was formed on the end of the SPG membrane cylinder; thereupon, there was provided a cylinder 10 measuring 155 mm in total length and having both a porous portion 100 and a non-porous membrane portion 101. In the member 22, a through hole was formed which extended vertically to the axis of the cylinder 10 and in a tangential direction to the cylinder 10, and this through hole was used as an introducing pipe 20. The introducing pipe had a circular cross section and an inner diameter of 2.0 mm.

A member 44 was so disposed as to cover the outer periphery of the cylinder 10, whereby a storage portion 40 was formed. The height of the storage portion 40 (the difference between the inner radius of the member 44 and the outer radius of the cylinder 10) was 2.0 mm. A stainless steel cylindrical member 32 having an outlet measuring 4.5 mm in inner diameter was disposed on the other end of the cylinder 10 so as to close said end of the cylinder 10, whereby an outlet 14 and a discharge pipe 30 were formed. As shown in FIG. 1, O-rings were inserted into the space between the member 44 and the cylinder 10 at both ends of the member 44. Thus, the production device of the present invention was provided. This product device was positioned such that, as shown in FIG. 1, the axis of the cylinder was approximately vertical and the introducing pipe 20 was located below.

Reference Example 1

Evaluation of Mixing Efficiency

The mixing efficiency of the present invention was evaluated by the Villermaux-Dushman method. This method is a technique in which mixing efficiency is evaluated through competitive complex reactions of Schemes (1), (2) and (3) mentioned below. When the neutralization reaction (1) is allowed to compete with the oxidation-reduction reaction (2), the neutralization in reaction (1) proceeds locally under insufficient mixing and on account of the local residual hydrogen ions, reaction (2) goes more to the right than to the left, thereby producing the iodine molecule ($I_2$). As indicated by reaction (3), this iodine molecule is present in equilibrium with the triiodide ion; thus, the mixing efficiency can be evaluated by quantifying the triiodide ions produced, i.e., if the amount of the triiodide ions is great, the mixing efficiency may be evaluated to be high.

[Formula 1]

$$H_2BO_3^- + H^+ \leftrightarrow H_3BO_3 \text{ Instantaneous} \quad (1)$$

$$5I^- + IO_3^- + 6H^+ \leftrightarrow 3I_2 + 3H_2O \text{ High rate} \quad (2)$$

$$I^- + I_2 \leftrightarrow I_3^- \text{ Equilibrium} \quad (3)$$

As liquid a, a 1:1 mixture of boric acid and sodium hydroxide (hereinafter referred to as "borate buffer") containing potassium iodide and potassium iodate was provided, and was introduced from the introducing pipe 20 of the device produced in Example 1 at flow rates of 0.5 L, 1.0 L, 1.5 L, 2.0 L and 2.5 L per minute to produce swirl flows in the internal space of the cylinder 10 (Test Nos. I-1 to I-5 and II-1 to II-5). As liquid b, moderately diluted sulfuric acid was jetted into each of the swirl flows of the borate buffer through the porous membrane. The flow ratios of the borate buffer to the diluted sulfuric acid solution (mixing ratios) were 10:1 and 4:1. The foregoing procedure was repeated three times in each of the tests.

In this example, reaction liquids were used at the concentrations shown in Table 1, and in order to stabilize the produced triiodine ions, the mixed solutions were prepared such that the pH was within the range of 8.5 to 9.5. The triiodine ions were quantified at an absorption wavelength of 353 nm. For absorbances of 1.7 and higher, the reaction system was diluted with distilled water and the measured absorbance of the dilution was multiplied by the dilution factor to obtain the true absorbance. The results are shown in Table 2.

Reference Example 2

The device set up in Production Example 1 was used as a device for comparison, provided that the end of the cylinder 10 which was equipped with the introducing pipe 20 was left open. The same procedure as in Reference Example 1 was performed to quantify triiodine ions, except that a borate buffer was caused to flow from the open end in the longitudinal direction of the cylinder 10 (Test Nos. I-6 to I-10 and II-6 to II-10). The results are shown in Table 2.

TABLE 1

| | Reagent concentrations at different flow ratios | | | | |
|---|---|---|---|---|---|
| Test | Flow ratio | Concentration ×10$^{-2}$ (mol/L) | | | |
| No. | a:b | $H_2SO_4$ | KI | $KIO_3$ | NaOH | $H_3BO_3$ |
| I | 10:1 | 8.25 | 0.88 | 0.17 | 2.48 | 2.48 |
| II | 4:1 | 7.35 | 1.00 | 0.19 | 2.81 | 2.81 |

TABLE 2

Comparison of mixing efficiencies of the swirl-flow and linear-flow methods

| Test No. | | Flow of liquid a | Flow ratio a:b | Flow rate (mL/min) | | Absorbance |
|---|---|---|---|---|---|---|
| | | | | Liquid a | Liquid b (membrane permeation flow) | |
| Ref. Ex. 1 | I-1 | Swirling | 10:1 | 500 | 50 | 1.45 ± 0.09 |
| | I-2 | | | 1000 | 100 | 0.63 ± <0.05 |
| | I-3 | | | 1500 | 150 | 0.38 ± <0.05 |
| | I-4 | | | 2000 | 200 | 0.22 ± <0.05 |
| | I-5 | | | 2500 | 250 | 0.20 ± <0.05 |
| Ref Ex. 2 | I-6 | Linear | 10:1 | 500 | 50 | 2.90 ± 0.41 |
| | I-7 | | | 1000 | 100 | 2.38 ± 0.35 |
| | I-8 | | | 1500 | 150 | 2.00 ± 0.31 |
| | I-9 | | | 2000 | 200 | 1.58 ± 0.30 |
| | I-10 | | | 2500 | 250 | 1.64 ± 0.26 |
| Ref. Ex. 1 | II-1 | Swirling | 4:1 | 500 | 125 | 0.62 ± 0.10 |
| | II-2 | | | 1000 | 250 | 0.27 ± <0.05 |
| | II-3 | | | 1500 | 375 | 0.14 ± <0.05 |
| | II-4 | | | 2000 | 500 | 0.08 ± <0.05 |
| | II-5 | | | 2500 | 625 | 0.04 ± <0.05 |
| Ref. Ex. 2 | II-6 | Linear | 4:1 | 500 | 125 | 2.13 ± 0.37 |
| | II-7 | | | 1000 | 250 | 1.64 ± 0.27 |
| | II-8 | | | 1500 | 375 | 1.17 ± 0.42 |
| | II-9 | | | 2000 | 500 | 0.94 ± 0.20 |
| | II-10 | | | 2500 | 625 | 0.61 ± 0.26 |

Note)
All of the porous membranes used had an average pore size of 2.1 μm.

The results in Table 2 show that the amounts of triiodine ions quantified in Reference Example 1 are smaller than those in Reference Example 2. This finding suggests that the present invention achieves high mixing efficiency.

Reference Example 3

Influence of the pore size of a porous membrane on mixing efficiency

The mixing efficiency was evaluated as in Reference Example 1, except that the average pore size of the porous membrane was changed to 1.1 μm, 2.1 μm, 4.9 μm and 10.1 μm, with the flow rate of liquid a being varied at 0.5 L, 1.0 L, 1.5 L, 2.0 L and 2.5 L per minute (Test Nos. III-VI). The flow ratio of the liquid a to the liquid b was 10:1 in all of the tests. The reagent concentrations used in this example are as shown in Table 3. The absorbances of the triiodine ions obtained in the respective tests are shown in Table 4.

TABLE 3

Reagent concentrations for Reference Example 3
Concentration ×10$^{-2}$ (mol/L)

| $H_2SO_4$ | KI | $KIO_3$ | NaOH | $H_3BO_3$ |
|---|---|---|---|---|
| 7.35 | 1.00 | 0.19 | 2.81 | 2.81 |

TABLE 4

Influence of the pore size of a porous membrane on production of triiodine ions

| Test No. | | Average particle size (μm) | Flow ratio a:b | Flow rate (mL/min) | | Absorbance |
|---|---|---|---|---|---|---|
| | | | | Liquid a | Liquid b | |
| III | 1 | 1.1 | 10:1 | 500 | 50 | 0.89 |
| | 2 | | | 1000 | 100 | 0.27 |
| | 3 | | | 1500 | 150 | 0.11 |
| | 4 | | | 2000 | 200 | 0.07 |
| | 5 | | | 2500 | 250 | 0.03 |
| IV | 1 | 2.1 | 10:1 | 500 | 50 | 0.50 |
| | 2 | | | 1000 | 100 | 0.24 |
| | 3 | | | 1500 | 150 | 0.18 |
| | 4 | | | 2000 | 200 | 0.12 |
| | 5 | | | 2500 | 250 | 0.09 |
| V | 1 | 4.9 | 10:1 | 500 | 50 | 0.60 |
| | 2 | | | 1000 | 100 | 0.24 |
| | 3 | | | 1500 | 150 | 0.13 |
| | 4 | | | 2000 | 200 | 0.11 |
| | 5 | | | 2500 | 250 | 0.09 |
| VI | 1 | 10.1 | 10:1 | 500 | 50 | 0.58 |
| | 2 | | | 1000 | 100 | 0.24 |
| | 3 | | | 1500 | 150 | 0.12 |
| | 4 | | | 2000 | 200 | 0.11 |
| | 5 | | | 2500 | 250 | 0.06 |

Table 4 reveals that almost the same mixing efficiency can be achieved by using any of porous membranes having average pore sizes of 1.1-10.1 μm.

Example 1

Production of Calcium Carbonates

A 0.15 M sodium carbonate solution and a 1.5 M calcium chloride solution were provided as liquids a and b, respectively. The porous membrane (SPG membrane) used had an average pore size of 2.1 μm.

Figure 4:
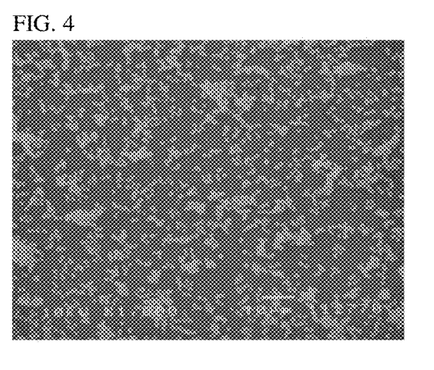
FIG. 4 is a SEM image at 1000× magnification of the fine calcium carbonate particles obtained in Example.
Figure 5:
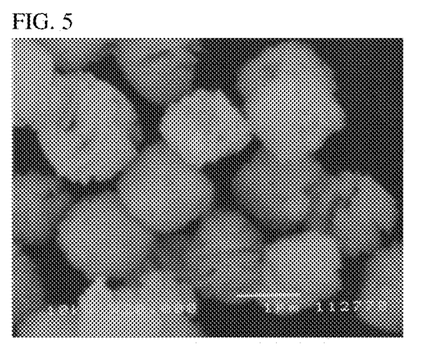
FIG. 5 is a SEM image at 20000× magnification of the fine calcium carbonate particles obtained in Example.

The liquid a was introduced from the introducing pipe 20 of the device produced in Reference Example 1 at flow rates of 0.5 L, 1.0 L and 1.5 L per minute, and the liquid b was supplied through the porous membrane into the cylinder 10 at flow rates of 0.05 L, 0.1 L and 0.15 L per minute. As a result, calcium carbonate suspensions were obtained. These suspensions were irradiated with ultrasound waves for 12 minutes to disintegrate the agglomerates of fine particles and disperse them, and then the particle size distributions of the resulting particle suspensions were determined by a laser diffraction particle size distribution analyzer (Wing-SALD 200; Shimadzu Corporation). Further, the suspensions were dried to isolate fine calcium carbonate particles, and the isolated particles were evaporated with gold and observed by a scanning electron microscope (SEM) (JSM-5310; JEOL Ltd.) (FIGS. 4 and 5). The production conditions and the results are shown in Table 5.

Comparative Example 1

Production of Calcium Carbonates

The same procedure as in Example 1 was performed to produce and evaluate calcium carbonates, except that the liquid a was introduced in the form of a linear flow as in Reference Example 2. The results are shown in Table 5.

TABLE 5

Characteristics of fine calcium carbonate crystal particles

| Test No. | Flow of liquid a | Flow rate of liquid a (mL/min) | Flow rate of liquid b (mL/min) | Average particle size (μm) | Particle size distribution span |
|---|---|---|---|---|---|
| Ex. 1 1 | Swirling | 500 | 50 | 1.5 | 1.3 |
| 2 | | 1000 | 100 | 1.2 | 1.1 |
| 3 | | 1500 | 150 | 0.8 | 1.2 |

TABLE 5-continued

Characteristics of fine calcium carbonate crystal particles

| Test No. | Flow of liquid a | Flow rate of liquid a (mL/min) | Flow rate of liquid b (mL/min) | Average particle size (μm) | Particle size distribution span |
|---|---|---|---|---|---|
| Com. Ex. 1 4 | Linear | 500 | 50 | 9.4 | 0.91 |
| 5 | | 1000 | 100 | 8.0 | 0.94 |
| 6 | | 1500 | 150 | 5.8 | 0.74 |

Liquid a: 0.15M $Na_2CO_3$
Liquid b (membrane permeation liquid): 1.5M $CaCl_2$

In Example 1, the calcium carbonates obtained at the swirl flow rates of 0.5 L, 1.0 L and 1.5 L per minute had average particle sizes of 1.5 μm, 1.2 μm and 0.8 μm, respectively. This finding shows that the present invention can produce fine calcium carbonate particles and that the size of the particles to be produced can be controlled by varying the swirl flow rate. The results also show that the particle size distribution spans (defined as $(D_{90}-D_{10})/D_{50}$) of the resulting fine particles were in the range of 1.1 to 1.3, i.e., these particles had low polydispersity, and that little influence is exerted on the span by the swirl flow rate. The SEM images for the fine calcium carbonate particles prepared in Test No. 3 of Example 1 are shown in FIGS. 4 and 5.

Figure 6:
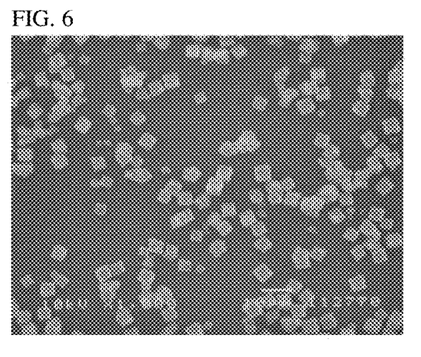
FIG. 6 is a SEM image at 1000× magnification of the fine calcium carbonate particles obtained in Comparative Example.
Figure 7:
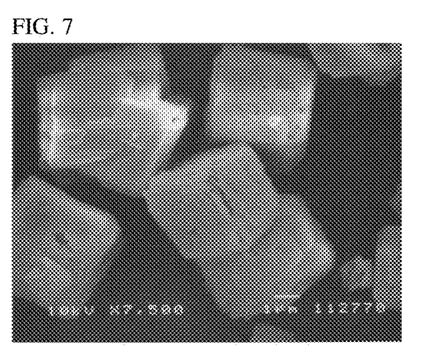
FIG. 7 is a SEM image at 7500× magnification of the fine calcium carbonate particles obtained in Comparative Example.

In Comparative Example 1, the calcium carbonates obtained at the linear flow rates of 0.5 L, 1.0 L and 1.5 L per minute had average particle sizes of 9.4 μm, 8.0 μm and 5.8 μm; this shows that the calcium carbonates of Comparative Example 1 had higher particle sizes than those of Example 1. Comparison between Example 1 and Comparative Example 1 shows that the swirl flow method can micronize calcium carbonate particles to ⅙-⅐ in terms of particle size and to about 1/300 in terms of particle volume. The SEM images for the fine calcium carbonate particles prepared in Test No. 6 of Comparative Example 1 are shown in FIGS. 6 and 7.

Example 2

Production of Calcium Carbonates

The same procedure as in Example 1 was performed to produce fine calcium carbonate particles, except that for the purpose of investigating the influence of the reactant concentrations, the liquid a was provided at concentrations of 0.06, 0.09, 0.12 and 0.15 mol/L, and the liquid b was provided at concentrations of 0.6, 0.9, 1.2 and 1.5 mol/L. The production conditions and the results are shown in Table 6.

TABLE 6

Characteristics of fine calcium carbonate crystal particles

| Test No. | | Conc. of liquid a (mol/L) | Conc. of liquid b (mol/L) | Flow rate of liquid a (mL/min) | Flow rate of liquid b (mL/min) | Average particle size (μm) | Particle size distribution span |
|---|---|---|---|---|---|---|---|
| I | 1 | 0.06 | 0.6 | 500 | 50 | 4.0 | 0.85 |
| | 2 | | | 1000 | 100 | 2.4 | 2.3 |
| | 3 | | | 1500 | 150 | 2.0 | 3.1 |
| II | 1 | 0.09 | 0.9 | 500 | 50 | 4.7 | 0.74 |
| | 2 | | | 1000 | 100 | 1.2 | 1.6 |
| | 3 | | | 1500 | 150 | 1.1 | 2.6 |
| III | 1 | 0.12 | 1.2 | 500 | 50 | 0.74 | 0.75 |
| | 2 | | | 1000 | 100 | 1.1 | 1.2 |
| | 3 | | | 1500 | 150 | 0.7 | 1.1 |
| IV | 1 | 0.15 | 1.5 | 500 | 50 | 1.5 | 1.3 |
| | 2 | | | 1000 | 100 | 1.2 | 1.1 |
| | 3 | | | 1500 | 150 | 0.8 | 1.2 |

The results in Table 6 show that when the liquids a and b are both provided at high concentrations, fine crystal particles with smaller particle size can be obtained. In other words, it is found that a shorter migration distance required for collision of carbonate ions and calcium ions is effective for producing fine crystal particles with smaller average particle size.

Example 3

Production of Calcium Carbonates

The same procedure as in Example 2 was performed to produce fine calcium carbonate particles, except that for the purpose of investigating the influence of the flow ratio of the liquids a and b, the flow ratios of 1:6, 1:8 and 1:10 were adopted and their concentrations were adjusted such that the reaction for production of calcium carbonate would proceed without any excess or deficiency in stoichiometry. The production conditions and the results are shown in Table 7.

TABLE 7

Characteristics of fine calcium carbonate crystal particles

| Test No. | | Conc. of liquid a (mol/L) | Conc. of liquid b (mol/L) | Flow ratio a:b | Flow rate of liquid a (mL/min) | Flow rate of liquid b (mL/min) | Average particle size (μm) | Particle size distribution span |
|---|---|---|---|---|---|---|---|---|
| I | 1 | 0.159 | 0.955 | 6:1 | 500 | 83 | 6.0 | 0.67 |
|   | 2 |       |       | 8:1 | 1000 | 167 | 6.1 | 0.65 |
|   | 3 |       |       | 10:1 | 1500 | 250 | 4.6 | 0.72 |
| II | 1 | 0.153 | 1.227 | 6:1 | 500 | 63 | 2.3 | 1.8 |
|    | 2 |       |       | 8:1 | 1000 | 125 | 0.9 | 1.6 |
|    | 3 |       |       | 10:1 | 1500 | 188 | 0.9 | 1.1 |
| III | 1 | 0.15 | 1.5 | 6:1 | 500 | 50 | 1.5 | 1.3 |
|     | 2 |      |     | 8:1 | 1000 | 100 | 1.2 | 1.1 |
|     | 3 |      |     | 10:1 | 1500 | 150 | 0.8 | 1.2 |

The results in Table 7 show that fine crystal particles with smaller average particle size can be obtained at a flow ratio a:b of 8:1 or 10:1 rather than 6:1, whereas a smaller span can be obtained at the flow ratio of 6:1. This finding shows that the smaller the degree by which the kinetic energy of a swirl flow is attenuated by the liquid that permeates the membrane, the greater the effect for preparing fine crystals.

Example 4

Production of Calcium Carbonates

This example investigated the influence of exchanging the two reactants supplied in Example 3 as a swirl flow and a membrane permeation flow. More specifically, the liquid a and liquid b (membrane permeation liquid) provided in Example 3 were an aqueous $Na_2CO_3$ solution at 0.15 mol/L and an aqueous $CaCl_2$ solution at 1.5 mol/L, respectively, whereas those liquids provided in this example were an aqueous $CaCl_2$ solution at 0.15 mol/L and an aqueous $Na_2CO_3$ solution at 1.5 mol/L, respectively. The flow ratios of the liquids a and b, and the flow rates of these liquids were the same as in Example 3. The production conditions and the results are shown in Table 8.

TABLE 8

Characteristics of fine calcium carbonate crystal particles

| Test No. | | Liquid a | Liquid b | Flow ratio a:b | Flow rate of liquid a (mL/min) | Flow rate of liquid b (mL/min) | Average particle size (μm) | Particle size distribution span |
|---|---|---|---|---|---|---|---|---|
| Ex. 4 | 1 | $CaCl_2$ | $Na_2CO_3$ | 6:1 | 500 | 50 | 6.2 | 0.68 |
|       | 2 |          |            | 8:1 | 1000 | 100 | 4.1 | 0.75 |
|       | 3 |          |            | 10:1 | 1500 | 150 | 3.4 | 0.88 |
| Ex. 3 | III-1 | $Na_2CO_3$ | $CaCl_2$ | 6:1 | 500 | 50 | 1.5 | 1.3 |
|       | III-2 |            |          | 8:1 | 1000 | 100 | 1.2 | 1.1 |
|       | III-3 |            |          | 10:1 | 1500 | 150 | 0.8 | 1.2 |

Comparison between the results of Examples 3 and 4 reveals that the exchange between the reactants in the swirl flow and the membrane permeation liquid resulted in the production of fine crystal particles with greatly differing sizes and spans. This may be due to the difference between calcium and carbonate ions in mobility in water. More specifically, it can be seen that fine crystal particles with smaller particle sizes can be produced when calcium ions having lower mobility than bicarbonate ions are contained in the membrane permeation flow which needs only a short diffusion distance to collide with bicarbonate ions.

REFERENCE SIGNS LIST

1 Production device of the present invention

10 Cylinder

100 Porous membrane portion having a circumferential surface composed of a porous membrane 101 Non-porous membrane portion having a circumferential surface composed of some other material 12 Inlet 14 Outlet 16 Inner wall surface 20 Introducing pipe 22 Member 30 Discharge pipe 32 Member 40 Storage portion 42 Liquid b introducing pipe 44 Member 80 Seal ring

The invention claimed is:

1. A method for producing fine crystal particles, comprising:
    a swirl flow producing step at which a swirl flow of liquid a comprising reactant A is supplied into a cylinder having a circumferential surface partially or wholly composed of a porous membrane; and
    a reaction step at which liquid b comprising reactant B which is reactive with the reactant A is supplied through the porous membrane to the swirl flow to effect mixing, whereby the reactants A and B are reacted to precipitate fine crystal particles.

2. The method according to claim 1,
wherein the cylinder is provided on the circumferential surface in the vicinity of one end thereof with an inlet for the liquid a and also provided with an introducing pipe extending from the inlet approximately vertically to the axis of the cylinder and in a tangential direction to the cylinder, and
wherein the swirl flow producing step is a step at which the liquid a is caused to flow through the introducing pipe approximately vertically to the axis of the cylinder and from the tangential direction to an inner wall surface of the cylinder to thereby produce a swirl flow.

3. The method according to claim 1, wherein the fine crystal particles at the reaction step have an average particle size of 0.5 to 5 μm.

4. The method according to claim 3, wherein the fine crystal particles have a span of 0.5 to 1.5, the span being defined by the following equation (1):

$$\text{Span} = (d_{90} - d_{10})/d_{50} \quad (1)$$

where:
$d_{10}$: the particle size at 10% in the cumulative distribution of particles,
$d_{90}$: the particle size at 90% in the cumulative distribution of particles,
$d_{50}$: the particle size at 50% in the cumulative distribution of particles.

5. The method according to claim 1, wherein the ratio of the flow rate of the liquid a to the flow rate of the liquid b (flow rate of liquid a/flow rate of liquid b) is in the range from 4 to 10.

6. The method according to claim 1,
(1) wherein the method further comprises a step of providing a device comprising:
a cylinder having a circumferential surface partially or wholly composed of a porous membrane, the cylinder having an inlet for the liquid a comprising the reactant A being provided on the circumferential surface in the vicinity of one end thereof, and having an outlet for a product being provided in a cross section of the other end thereof;
an introducing pipe that is connected to the inlet such that the liquid a can flow approximately vertically to an axis of the cylinder and from a tangential direction to an inner wall of the cylinder, the introducing pipe which extends approximately vertically to the axis of the cylinder and in the tangential direction to the cylinder;
a storage portion for storing the liquid b comprising the reactant B, the storage portion being provided on an outside of the circumferential surface of the cylinder; and
a supply means for supplying the liquid b from the storage portion into the cylinder;
(2) wherein the swirl flow producing step is a step the liquid a is introduced from the introducing pipe into the cylinder to produce a swirl flow; and
(3) wherein the reaction step is a step at which the liquid b is supplied through the porous membrane to the swirl flow to effect mixing, whereby the reactants A and B are reacted to precipitate fine crystal particles.

7. The method according to claim 2, wherein the fine crystal particles at the reaction step have an average particle size of 0.5 to 5 μm.

8. The method according to claim 7, wherein the fine crystal particles have a span of 0.5 to 1.5, the span being defined by the following equation (1):

$$\text{Span} = (d_{90} - d_{10})/d_{50} \quad (1)$$

where:
$d_{10}$: the particle size at 10% in the cumulative distribution of particles,
$d_{90}$: the particle size at 90% in the cumulative distribution of particles,
$d_{50}$: the particle size at 50% in the cumulative distribution of particles.

9. The method according to claim 2, wherein the ratio of the flow rate of the liquid a to the flow rate of the liquid b (flow rate of liquid a/flow rate of liquid b) is in the range from 4 to 10.

10. The method according to claim 3, wherein the ratio of the flow rate of the liquid a to the flow rate of the liquid b (flow rate of liquid a/flow rate of liquid b) is in the range from 4 to 10.

11. The method according to claim 4, wherein the ratio of the flow rate of the liquid a to the flow rate of the liquid b (flow rate of liquid a/flow rate of liquid b) is in the range from 4 to 10.

* * * * *